United States Patent

Potash

[11] 4,020,394
[45] Apr. 26, 1977

[54] GROUND FAULT DETECTOR

[75] Inventor: Jerome Potash, Flemington, N.J.

[73] Assignee: OPT Industries, Inc., Phillipsburg, N.J.

[22] Filed: May 20, 1976

[21] Appl. No.: 688,123

[52] U.S. Cl. .................................. 361/45; 361/87; 361/142

[51] Int. Cl.² ...................................... H02H 3/28

[58] Field of Search ............ 317/18 D, 18 R, 33 R, 317/335 C, 58, 156 TR

[56] References Cited

UNITED STATES PATENTS 3,202,875  8/1965  Bateman .......................... 317/18 D

FOREIGN PATENTS OR APPLICATIONS 1,808,770  6/1970  Germany ......................... 317/18 D Primary Examiner—J D Miller
Assistant Examiner—Patrick R. Salce Attorney, Agent, or Firm—Arthur L. Lessler

[57] ABSTRACT

A ground fault detector for protecting an electrical power system against ground leakage currents. The detector is of the differential transformer type, in which the primary windings of the transformer are connected in series with the hot and neutral lines of the power system, any unbalance in the currents flowing through these lines being detected by sensing the unbalance voltage induced in the secondary winding of the transformer. The secondary voltage is amplified and employed to actuate a solenoid which trips the system circuit breaker in response to unbalance in line and neutral currents due to the flow of ground leakage current. A secondary winding on the solenoid is connected in the neutral line to cause the detector to operate in response to a neutral to ground fault, which might otherwise go undetected.

10 Claims, 3 Drawing Figures

GROUND FAULT DETECTOR

This invention relates to a ground fault detector for protecting an electrical power system against ground leakage currents, and more particularly to an improved detector of the differential transformer type.

In recent years there has been considerable interest in improving the safety of electrical power systems, for both commercial and residential applications. The National Electrical Code now requires electrical power cables include hot, neutral and ground conections, with the ground connection being connected to the neutral line at the power source, i.e. an electrical box or distribution panel. Conductive casings or supports of electrical loads such as motors, power tools, etc. are to be connected to the ground line, so that any fault or undesired connection between a hot line and any such casing or support, or ground, will cause current to flow through the ground connection.

Thus, if, for example, the hot line of a power tool were to short to the housing of the tool, in the absence of such a ground connection current would flow through the operator of the tool to ground, possibly causing serious or fatal shock to the operator. However, with the ground connection the current would flow through the ground line back to the power source, and this short circuit current would cause the system circuit breaker to trip. Thus the grounding arrangement described above provides full protection against direct short circuits between the hot line and any conductive object to which the ground line is connected.

In the event, however, that instead of a direct short circuit, a fault develops which results in flow of a leakage current through the ground line which is not of sufficient magnitude to cause the system circuit breaker to trip, a dangerous condition results, in which there is risk of electrical shock to personnel, or of electrical sparking which could cause fire or explosion in certain environments.

Therefore the National Electrical Code requires, in certain applications, that electrical power systems include devices to detect ground leakage currents of even small magnitude, and to disconnect power from the load circuit involved (usually by tripping the circuit breaker mechanically) when such leakage currents are detected. For example, the Code now requires such ground fault detectors to be used in circuits for kitchens and bathrooms in residential dwellings. It is required that these detectors respond to leakage currents as small as 5 milliamperes.

In order to enable use of ground fault detectors in conventional electrical distribution boxes and panels, it is essential that they be capable of fabrication in a package which is capable of being substituted for a conventional circuit breaker. Thus the size of the detector must be minimized, and evidently it is highly desirable to keep the cost thereof to a minimum as well.

Many ground fault detectors are known in the art, and a number of units are presently being commercially sold. A common type of ground fault detector unit is that which utilizes a differential transformer, usually having a toroidal core, for generating a voltage which corresponds to the difference between the currents flowing through the hot and neutral lines, this difference being equal to the ground fault current.

While the ordinary differential transformer type ground fault detector is capable of detecting faults from a hot line to ground of as little of 5 milliamperes, it may not be able to detect such magnitudes of fault currents when the fault involved is one between the neutral and ground lines. For the purpose of detecting such neutral to ground faults, it is known to provide a transformer having a primary connected across the power line on the source side of the differential transformer, and a secondary connected in series with the neutral line at a point near the differential transformer. This arrangement serves to provide a small current through one of the differential transformer primary windings, which serves to cause the detector to operate in the event of a ground to neutral fault.

An arrangement as described in the preceding paragraph is shown, for example, in U.S. Pat. No. 3,930,187.

The aforementioned arrangement, however, presents design problems when it is desired to reduce manufacturing costs and to minimize the unit size, since three separate magnetic units are required, each having a magnetic core, viz. (1) a solenoid to trip the circuit breaker, (2) a differential transformer to detect current imbalance between the hot and neutral lines, and (3) a transformer to inject a small current into the neutral line, as previously mentioned.

Another problem with the aforementioned prior art arrangement is that it is impractical to provide the current injection transformer (3) of the preceding paragraph with the large number of primary turns required for operation directly from the power line, because the resulting cost and bulk of the injection transformer would be intolerable from an economic and applications viewpoint. As a result, prior art devices have often utilized a dropping resistor in series with the primary winding of the injection transformer to reduce the number of primary turns required. Unfortunately, however, the power dissipated in this dropping resistor produces considerable heating of the surrounding area. When a ground fault detector is to be manufactured in a relatively small package, e.g. for substitution for conventional circuit breakers in a power distribution panel, the power dissipation of the dropping resistor may be completely unacceptable.

Another approach which has been taken to reducing the number of primary turns of the current injection transformer is the use of an oscillator circuit in conjunction with the transformer to effectively cause the current drawn by the transformer to oscillate at a given audio frequency, typically on the order of 5 KHz. Such an arrangement usually involves the generation of spaced audio frequency tone bursts by the transformer secondary. Since the transformer primary current frequency is about 83 times as great as the usual 60 Hz. line frequency, the reactance of the primary winding is correspondingly increased, permitting operation of the primary winding from the power line without the need for an excessively high number of primary turns. This approach, however, involves additional circuit complexity and is therefore undesirable.

Thus there is a need for a ground fault detector which incorporates the previously described features without the aforementioned disadvantages attendant upon the prior art approaches to provision of a current injection source for detecting line to neutral short circuits, as previously described.

Accordingly, an object of the present invention is to provide an improved ground fault detector of the differential transformer type.

As herein described, there is provided a ground fault detector for connection between an electrical power source and a load, said source and said load each having a ground connection, a neutral terminal, and at least one other terminal. The detector comprises circuit interrupting means comprising a solenoid device having a primary actuating winding and at least one secondary winding. A differential transformer is provided having at least two primary windings and a secondary winding, said transformer developing a voltage across the secondary winding thereof corresponding to the difference between the currents flowing through the primary windings thereof. Amplifier means is coupled between the secondary winding of the differential transformer and the circuit interrupting means for supplying an actuating voltage to the primary winding of said solenoid device when the voltage across the differential transformer secondary winding exceeds a predetermined value. Means is provided for connecting one primary winding of the differential transformer and the secondary winding of the solenoid device in series between the neutral terminal of the power source and the neutral terminal of the load. Means is provided for connecting another primary winding of the differential transformer between the other terminal of the power source and the other terminal of the load. Also provided is means for supplying an exciting voltage to the primary winding of the solenoid device, this exciting voltage being sustantially less than the voltage across the primary winding of the solenoid required to actuate the circuit interrupting means.

Figure 1:
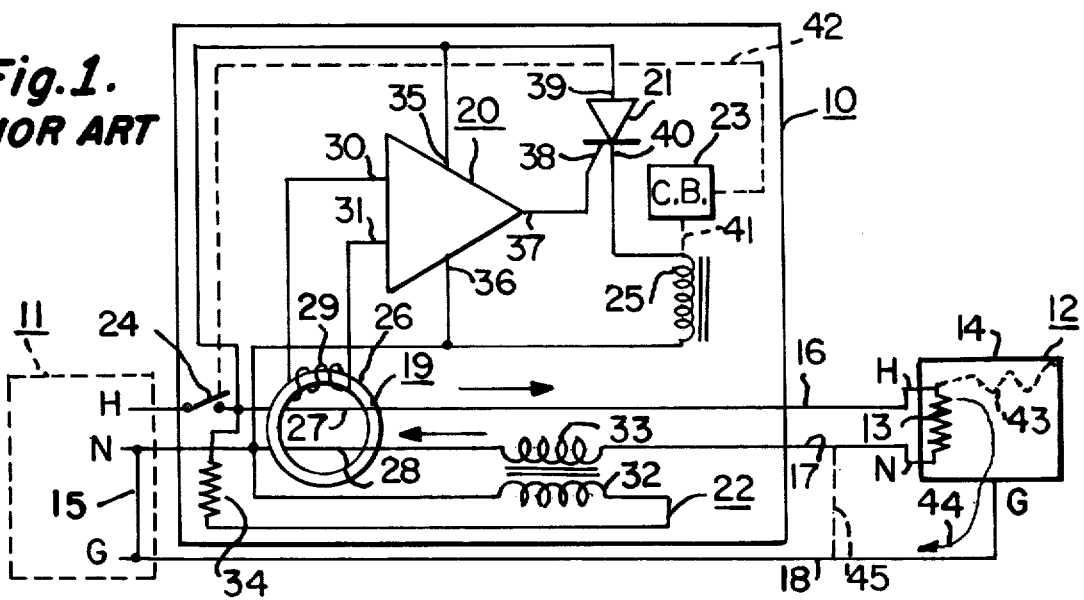
FIG. 1 shows a ground fault detector of the differential transformer type according to the prior art.

As shown in FIG. 1, a ground fault detector 10 according to the prior art, is connected in circuit between an electrical distribution panel 11 and a load 12. The panel and load each have a neutral terminal N, a "hot" terminal H, and a ground connection G. The load 12 comprises an electrical utilization element, indicated by the resistance 13, electrically connected between the hot terminal H and the neutral terminal N of the load 12. The utilization element 13 is situated within an electrically conductive housing 14, to which the ground G is electrically connected.

Within the distribution panel 11, a wire 15 serves to electrically connect the ground G to the neutral N.

An electrical path or wire 16 serves to connect the hot lead of the panel 11 to the hot lead of the load 12 through the detector 10. Similarly, another electrical path or wire 17 serves to connect the neutral lead of the panel 11 to the neutral lead of the load 12 through the detector 10. An electrical path or a wire 18 serves to connect the ground G of the panel 11 to the ground G of the load 12.

Situated within the detector 10 are a differential transformer 19, an amplifier 20, a controlled rectifier 21, a transformer 22, a circuit breaker 23 having a circuit interrupting switch 24, and a circuit breaker tripping solenoid 25.

The differential transformer 19 comprises a torodial core 26 of suitable magnetically permeable material, with single wires 27 and 28 passing through the core and serving as the primary windings of the transformer.

A multi-turn secondary winding 29 is wound on the core and electrically connected to the signal input terminals 30 and 31 of the amplifier 20.

The primary winding 27 of the transformer 19 is electrically connected in series with the switch 24 between the hot terminal H of the panel 11 and the hot terminal H of the load 12.

The transformer 22 has a primary winding 32 and a secondary winding 33. One terminal of the winding 32 is connected to the neutral terminal N of the panel 11. The other terminal of the winding 32 is connected through a dropping resistor 34 to the hot terminal H of the panel 11. The secondary winding 33 of the transformer 22 is connected in series with the primary winding 28 of the transformer 19 between the neutral terminal N of the panel 11 and the neutral terminal N of the load 12.

The power input terminals 35 and 36 of the amplifier 20 are connected to the hot and neutral terminals H and N of the panel 11 respectively.

The output terminal 37 of the amplifier 20 is connected to the gate control electrode 38 of the controlled rectifier 21. One main electrode 39 of the controlled rectifier 21 is connected to the hot terminal H of the panel 11. The other main electrode 40 of the controlled rectifier 21 is connected to one end of the actuating winding of the solenoid 25. The other end of the actuating winding of the solenoid 25 is connected to the neutral terminal N of the panel 11.

The movable armature of the solenoid 25 is mechanically coupled for tripping of the circuit breaker 23, as indicated by the dashed line 41.

The circuit breaker 23 also contains a bimetallic tripping element, which causes the breaker to trip when the load current flowing through the switch 24 exceeds a predetermined maximum value. The mechanical connection between the breaker 23 and its switch 24 is indicated by the dashed line 42.

Typically, the voltage between the hot and neutral lines H and N at the panel 11 may be on the order of 120 or 240 volts r.m.s. at 60 Hz., and the maximum load current to be supplied from these terminals may, in residential circuits, be on the order of 20 or 30 amperes.

Figure 2:
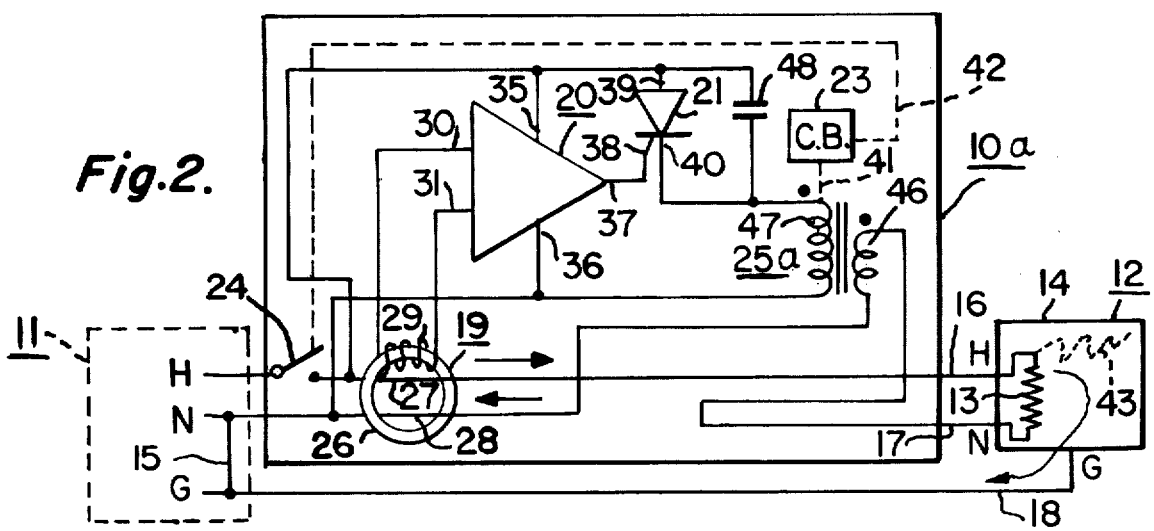
FIG. 2 shows a ground fault detector according to an embodiment of the present invention.
Figure 3:
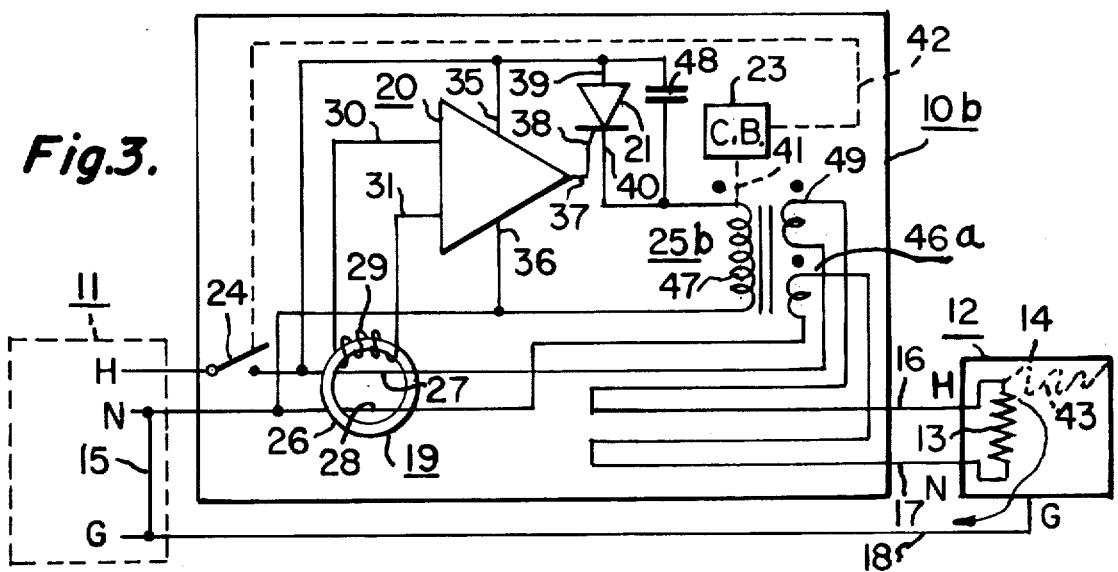
FIG. 3 shows a ground fault detector according to an alternative embodiment of the present invention.

The ground fault detectors shown in FIGS. 1 to 3 are capable, with suitable adjustment of design parameters, of operating at the above voltages and currents, as well as in other voltage and current ranges. By adding primary windings to the transformer 19, the detectors shown in FIGS. 1 to 3 can be made to operate with panel sources such as: 240 volts single phase center-tapped, i.e. 3 wire with each of the two hot wires being at 120 volts r.m.s. with respect to the neutral; three phase with neutral; three phase without neutral; or other single or multiple phase arrangements. The only essential requirement is that under normal, i.e. non-fault, conditions the algebraic sum of the currents flowing through the primary windings of the differential transformer 19 must be zero.

Referring again to FIG. 1, under normal, i.e. non-fault operating conditions, current flows from the hot terminal H of the panel 11, through the primary winding 27 of the differential transformer 19, through the circuit breaker switch 24, through the load terminal H, resistance 13, and load terminal N, through the secondary winding 33 of the transformer 22, the primary winding 28 of the differential transformer 19, and back to the neutral terminal N of the panel 11, during the half cycle when the panel terminal H is positive with respect to the panel terminal N. During the other half cycle these flow directions are reversed.

Thus during normal operation the currents flowing through the primary windings 27 and 28 of the differential transformer 19 are at all times equal in magnitude and opposite in direction, so that no voltage is induced in the secondary winding 29 of said transformer. Thus no input signal is generated to the amplifier 20, and no output signal appears at the output terminal 37 thereof. As a result, the actuating winding of the solenoid 25 is not supplied with any voltage, and the solenoid does not operate, so that the circuit breaker 23 is not tripped.

When a fault appears from the hot line 16 to ground, as represented by the dashed resistance 43, indicating a leakage path from the hot end of the load resistance 13 to the conductive grounded housing 14 of the load 12, some of the current flowing through the hot line 16, instead of returning through the neutral line 17, is diverted through the leakage path 43 and returns to the panel 11 through the ground line or path 18, as indicated by the arrow 44. Thus the current flowing through the neutral line 17 is now less than that flowing through the hot line 16, and since the currents flowing through the primary windings of the differential transformer 19 are now unequal, a voltage corresponding to the difference between said currents is induced in the secondary winding 29 of the transformer 19.

The resulting signal is coupled to the amplifier 20, which may be designed so that a 5 milliampere difference between the currents flowing through the hot and neutral lines 16 and 17 will cause an output signal to appear at the amplifier output terminal 37. The output signal thus generated causes the gate or control electrode 38 to which the amplifier output terminal is connected to trigger the controlled rectifier 21 into conduction, thus applying the full supply voltage across the actuating winding of the solenoid 25, which is then actuated. The armature of the solenoid 25 then moves to trip the circuit breaker 23, thus causing the breaker switch 24 to open, disconnecting the power source at the panel 11 from the load 12.

The detector shown in FIG. 1 operates effectively to protect the power system against leakage currents from the hot line to ground in the manner previously described. However, in the absence of the transformer 33, this circuit would not effectively provide protection against leakage currents from neutral to ground, which are also undesirable. The National Electrical Code requires that no current of any significant magnitude flow through the ground line or path, so that protection against this type of fault is now mandated by the Code.

Assume, for example, that at some point between the fault detector 10 and the load 12, a leakage or fault path develops between the neutral line 17 and the ground line or path 18, as indicated by the dashed line 45. The conductive paths 15 and 45, in conjunction with the portions of the lines 17 and 18 between them, form a "shorted turn" for the winding 28. This "shorted turn" tends to reduce the sensitivity of the differential transformer 27 and to prevent imbalance voltages from being induced in the secondary winding 29 thereof, with the resultant possibility that significant leakage currents will not be detected by the detector 10. Another effect which reduces the sensitivity of the detector to leakage currents under these conditions is that any leakage current flowing through the portion of the ground line between the leakage path 45 and the ground terminal G of the load 12 will divide between the lines 17 and 18, in accordance with the relative impedances involved, so that while the entire leakage current will flow through the portion of the ground line between the path 45 and the load terminal G, only a portion of this leakage current will be diverted from the portion of the neutral line which comprises the primary winding 28 of the differential transformer 19.

To alleviate these problems and provide reliable and sensitive response to neutral-to-ground leakage faults, the transformer 22 is provided. In the event of a neutral to ground fault such as that indicated by the leakage path 45, the secondary winding 33 of the transformer 22 drives a current around the "loop" formed by the paths 15, 45 and the portions of the lines 17 and 18 between said paths. This driven current passes through the primary winding 28 of the differential transformer 19 and induces a voltage in the secondary winding 29 thereof which causes the amplifier 20 to actuate the solenoid 25 via the controlled rectifier 21, causing tripping of the circuit breaker 23 and opening of its switch 24.

Due to the very small potential difference between the neutral and ground lines 17 and 18, it is reasonable to assume that any leakage currents from neutral to ground corresponding to a leakage path resistance of more than about 0.2 to 5 ohms, depending on the particular circuit application, would be completely negligible. In order to provide about 5 milliamperes of current flow to insure actuation of the solenoid 25 and tripping of the breaker 23, the voltage provided across the secondary winding of the transformer 22 should preferably be in the range of 10 to 25 millivolts.

While the detector shown in FIG. 1 operates in a generally satisfactory fashion, it requires three magnetic circuit elements, each having a magnetic core, i.e. the differential transformer 19, the transformer 22, and the solenoid 25. In many practical applications the size and configuration of the detector presents a problem, since the detector is often required to approximate the size and shape of a conventional circuit breaker, so that for example in residential applications, such detectors can be installed in standard distribution panels in substitution for the kitchen and bathroom breakers.

According to the present invention, FIGS. 2 and 3 show improved versions of the detector of FIG. 1, i.e. versions which can be manufactured at lower cost in a more compact configuration than that of FIG. 1.

The improved detectors 10a and 10b shown in FIGS. 2 and 3 respectively are intended for operation under the same conditions and between the same power sources and loads as the detector 10a of FIG. 1. These improved detectors function in a generally similar fashion to that of FIG. 1, and elements of the detectors 10a and 10b which have the same identifying numerals as corresponding elements of detector 10 perform corresponding functions.

As seen in FIGS. 2 and 3, there is no magnetic circuit element present in the detectors 10a and 10b which corresponds directly to the transformer 22 of the detector 10. The ferrite or other magnetically permeable core required for the transformer 22 has been eliminated, so that the detectors of FIGS. 2 and 3 require only two rather than three magnetic circuit elements. This feature enables a reduction in both the size and cost of the detectors 10a and 10b over the detector 10.

In effect the function of the transformer 22 of the detector 10 is, however, retained in the detectors 10a and 10b. This is accomplished by deriving the required drive voltage for the winding 28 of the differential transformer 19 from a secondary winding wound about the core of the solenoid 25a, which solenoid also performs the circuit breaker tripping function of the solenoid 25 of the detector 10. Applicant has discovered that such an arrangement, while necessitating certain constraints upon the relationship between the windings of the solenoid devices 25a and 25b, is nevertheless capable of practical realization without a degree of compromise which effectively would destroy the usefulness of such an arrangement.

Referring to FIG. 2, the ground fault detector 10a thereof functions, as previously mentioned, in a generally similar fashion to the detector 10 shown in FIG. 1, with elements having the same numeral designations performing corresponding functions in both units.

The solenoid device 25a of FIG. 2 performs the solenoid function of the device 25 of FIG. 1, and also performs the function of the transformer 22 of FIG. 1, with the secondary winding 46 of the solenoid device 25a corresponding to the secondary winding 33 of the transformer 22.

Various design problems are introduced by the utilization of the solenoid device 25a in the aforementioned manner, so that the desired functional performance cannot be realized by simply adding another winding to the solenoid 25 of FIG. 1 without regard to the interrelationship of the various circuit functions involved.

The secondary winding 46 of the solenoid device 25a must provide an output voltage sufficient to cause generation of an output signal at the output terminal 37 of the amplifier 20, i.e. it must drive at least 5 milliamperes through the primary winding 28 of the differential transformer 19 under conditions where the neutral line 17 is faulted to the ground line 18 on the load side of the detector 10a. As previously mentioned, this output voltage is preferably (but not necessarily) in the range of 10 to 25 millivolts, with about 15 millivolts being a desired value for design purposes.

At the same time, the secondary winding 46 should have a sufficiently high internal leakage reactance so that said winding and any associated circuit wiring will not be damaged by being essentially short-circuited by any neutral to ground fault that may occur, as previously mentioned.

In order to provide operating voltage across the secondary winding 46 of the solenoid device 25a on a continuous basis, it is necessary to provide excitation of the primary actuating winding 47 of said device. For this purpose, a capacitor 48 is coupled from the hot terminal H of the distribution panel 11 to one end of the winding 47, the other end of said winding being connected to the neutral terminal N of said panel. Alternatively, where the increased power dissipation is acceptable, a dropping resistor of equivalent impedance may be substituted for the capacitor 48.

The ratio between the turns of the primary and secondary windings 47 and 46 of the solenoid device 25a should be such that the excitation voltage appearing across the primary actuating winding 47 is substantially less than that voltage required to operate the armature of the solenoid to trip the circuit breaker 23, so that any possibility of false tripping due to line voltage surges or spikes is essentially eliminated. That is, the voltage appearing across the winding 47 when the controlled rectifier 21 is nonconductive should preferably be on the order of 20% or less of the voltage at which the solenoid armature is actuated, the actuation voltage typically being on the order of about 60 volts r.m.s. for a 120 v.r.m.s. line to neutral voltage. In applicant's preferred embodiment of the invention, the solenoid armature is actuated at about 60 volts r.m.s., and the excitation voltage developed across the primary actuating winding 47 by virtue of the presence of the capacitor 48 is about 12 v.r.m.s. In the preferred embodiment, the primary winding 47 has a D.C. resistance of about 200 ohms, so that (since the D.C. resistance is substantially greater than the A.C. reactance of the primary winding) the current required to actuate the solenoid armature is about 0.3 amperes, and the winding 47 draws about 0.6 amperes at normal (120 v.r.m.s.) line to neutral voltage. With these parameters, the current drawn by the primary actuating winding on a continuous excitation basis, at a voltage of 12 v.r.m.s., is about 0.06 amperes, resulting in a continuous power dissipation in the solenoid device 25a of about 0.72 watts, a tolerable level.

For a 120 v.r.m.s. line to neutral voltage, the capacitor 48 should preferably have a value, for a solenoid device having the parameters described above, of about 1.2 microfarad. If desired, a dropping resistor could be substituted for the capacitor 48. However, the additional power dissipation introduced into the detector 10a by this change would be undesirable, especially for applications in which the detector is manufactured in a relatively small package for use instead of circuit breakers in standard panel or distribution boxes, and this power dissipation disadvantage would have to be weighed against the cost differential between a resistor and the capacitor otherwise required.

While the turns ratio between the windings 47 and 46 of the solenoid device 25a must be sufficiently low so that (taking leakage reactances into account) and adequate voltage is developed across the secondary winding 46 without requiring an unduly high excitation voltage across the primary actuating winding 47, at the same time the turns ratio must be sufficiently high to insure that the maximum current flow through the winding 46 under normal operating (as opposed to overload) conditions will not cause actuation of the solenoid armature, resulting in false tripping. That is, if for example the circuit shown in FIG. 2 is designed to function with a maximum load current of 20 amperes, a current of 20 amperes flowing through the secondary winding 46 of the solenoid device 25a should be insufficient to cause actuation of the solenoid armature to trip the breaker 23. Normally, for such an arrangement, the circuit breaker 23 will be designed to trip in response to a sustained current exceeding the 20 ampere maximum.

In order to insure that momentary surges due to capacitive loads, in motors or other devices, will not cause false tripping of the breaker 23, it is preferred to design the solenoid device 25a so that the secondary current through the winding 46 at which the solenoid armature actuates is at least ten times the maximum sustained current (20 amperes in the above arrangement) at which the circuit is designed to operate.

The required relationship between the primary and secondary windings of the solenoid device 25a to meet the aforementioned criteria may be mathematically stated as follows:

$N_p.I_p \gg N_s.I_L$ where $N_p$ = number of turns of primary actuating winding 47 of solenoid device 25a $I_p$ = minimum current through primary winding 47 of solenoid device 25a required to cause actuation thereof, i.e. movement of solenoid armature to cause tripping of circuit breaker 23

$N_s$ = number of turns of secondary winding 46 of solenoid device 25a $I_L$ = maximum sustained current to be supplied from panel 11 to load 12.

For typical applications along the lines previously described, the ratio of primary to secondary turns of the solenoid device 25a should preferably be in the range of 800:1 to 1200:1, with a ratio on the order of 1000:1 being desirable. A typical solenoid device 25a having the parameters described on page 13 of this application may, for example, have 1000 primary turns and 1 secondary turn, which may if desired consist of a length of copper foil surrounding the primary winding 47.

The arrangement of the detector 10b shown in FIG. 3 functions in essentially the same manner as the detector 10a of FIG. 2, except that an additional secondary winding 49 is connected in series with the hot line 16, with the other secondary winding 46a being connected, as before, in the neutral line 17. This circuit functions to provide protection against neutral to ground faults in essentially the same manner as the circuit of FIG. 2. The secondary windings 46a and 49 have the same numbers of turns, and are preferably wound in bifilar fashion. Thus the currents flowing through these windings are (under non-fault conditions) equal and opposite, so that the problem of false tripping of the breaker 23 due to flow of load current through these windings is eliminated, allowing additional design flexibility for the windings of the solenoid device 25b.

It will be obvious to those skilled in the art that certain variations of the invention are possible without disturbing its efficacy. For example, the detectors 10a and 10b may be readily adapted for use in three phase or multi-phase systems, or at other voltages and frequencies than the 120 v.r.m.s., 60 Hz systems described in connection with a specific example of the invention. The secondary winding 46 (or 46a) may be connected in the ground line instead of the neutral line, where such an arrangement is practical.

While the relative orientations of the windings of the solenoid devices 25a and 25b are not critical (except that currents should flow in magnetically opposite directions through the secondary windings of the device 25b), it is preferred that the windings be oriented in the manner indicated by the dots adjacent the windings in FIGS. 2 and 3. The reason for this preferred orientation is as follows.

Referring to FIG. 2, for example, with the orientations shown by the dots adjacent the windings 46 and 47 therein, when the hot line H is positive with respect to the neutral line N, current will flow in the direction indicated by the arrows adjacent these lines. If there is a neutral to ground short the current flowing through the hot line will be greater than the current flowing through the portion of the neutral line which passes through the core of the differential transformer 19. With the windings of the solenoid device 25a having the orientations shown in FIG. 2, the direction of the current injected into the neutral line by the secondary winding 46 will be opposite to that of the arrow adjacent the neutral line; that is, the injected current will tend to further reduce the total neutral current flowing through the primary winding 28 of the differential transformer 19, thus accentuating the current difference between the primary windings 27 and 28 of the differential transformer 19, and speeding up the tripping of the breaker 23.

If the relative winding orientations of the device 25a were reversed, the current injected by the winding 46 would tend to oppose the effect of a reduction in current flow through the neutral line due to a neutral to ground fault, thus reducing the sensitivity of the detector, and possibly preventing tripping in response to a ground to neutral fault.

It should be understood that while a lower limit of about 10 millivolts on the open circuit secondary voltage(s) of the solenoid device 25a (25b) is desirable for reliable operation, there is no corresponding upper limit, the 25 millivolt value, i.e. 10 to 25 millivolt range previously given, being illustrative only. Depending on the particular arrangement and circuit values involved, secondary voltages considerably in excess of 25 millivolts may be appropriate. I claim:

1. A ground fault detector for connection between an electrical power source and a load, said source and said load each having a ground connection, a neutral terminal, and at least one other terminal, said detector comprising:

circuit interrupting means comprising a solenoid device having a primary actuating winding and at least one secondary winding;

a differential transformer having at least two primary windings and a secondary winding, said transformer developing a voltage across the secondary winding thereof corresponding to the difference between the currents flowing through the primary windings thereof;

amplifier means coupled between the secondary winding of said differential transformer and said circuit interrupting means for supplying an actuating voltage to the primary winding of said solenoid device when the voltage across said differential transformer secondary winding exceeds a predetermined value;

means for connecting one primary winding of said differential transformer and the secondary winding of said solenoid device in series between the neutral terminal of said power source and the neutral terminal of said load;

means for connecting another primary winding of said differential transformer between the other terminal of said power source and the other terminal of said load; and means for supplying an exciting voltage to the primary actuating winding of said solenoid device, said exciting voltage being substantially less than the voltage across said primary actuating winding required to actuate said circuit interrupting means.

2. The detector according to claim 1, wherein said power source supplies a predetermined maximum current to said load, said maximum current when flowing through said solenoid device secondary winding being insufficient to cause said device to be actuated.

3. The detector according to claim 2, wherein the primary and secondary windings of said solenoid device satisfy the following relationship:

$$N_p \cdot I_p >> N_s \cdot I_L$$

where $N_p$ = number of turns of primary actuating winding of said solenoid device $I_p$ = current through said primary winding required to actuate said device $N_s$ = number of turns of secondary winding of said solenoid device $I_L$ = said predetermined maximum current supplied by said power source to said load 4. The detector according to claim 3, wherein the open circuit voltage developed across said secondary winding of said solenoid device when said exciting voltage is applied to the primary actuating winding thereof, is at least 10 millivolts.

5. The detector according to claim 2, wherein said differential transformer has a toroidal core, each of said primary windings of said transformer comprising a single wire passing through said core.

6. The detector according to claim 5, wherein said circuit interrupting means includes a circuit breaker for interrupting the supply of electrical power to said load when the current flowing through said last mentioned connecting means exceeds said predetermined maximum current, said solenoid device being coupled to said circuit breaker to trip said breaker when said solenoid device is actuated.

7. The detector according to claim 2, wherein said solenoid device has an additional secondary winding, further comprising means for connecting said additional secondary winding in series with said other primary winding of said differential transformer between said other terminal of said power source and said other terminal of said load.

8. The detector according to claim 7, wherein the secondary windings of said solenoid device are bifilar.

9. The detector according to claim 4, wherein the ratio of primary winding to secondary winding turns of said solenoid device is in the range of 800:1 to 1200:1.

10. The detector according to claim 9, wherein said turns ratio is on the order of 1000:1.

* * * * *